United States Patent
Olding et al.

(10) Patent No.: US 8,355,696 B1
(45) Date of Patent: Jan. 15, 2013

(54) AUTOMATED DEVICE ACTIVATION

(75) Inventors: Douglas Alan Olding, Overland Park, KS (US); Ahsan Habib, Olathe, KS (US); Warren Bruce Cope, Olathe, KS (US); Nadine Lamoure Manjaro, Overland Park, KS (US); Shane Robert Werner, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1030 days.

(21) Appl. No.: 11/759,660

(22) Filed: Jun. 7, 2007

(51) Int. Cl.
*H04M 1/66* (2006.01)

(52) U.S. Cl. ..... 455/411; 455/406; 455/410; 455/412.2; 455/414.1; 455/418

(58) Field of Classification Search .............. 455/414.1, 455/418, 419, 422.1, 432.1, 435, 456.1, 456.2, 455/456.3, 456.4, 456.6, 567
See application file for complete search history.

(56) References Cited

U.S. PATENT DOCUMENTS

| | | | |
|---|---|---|---|
| 2002/0037714 A1* | 3/2002 | Takae et al. | 455/419 |
| 2003/0120920 A1* | 6/2003 | Svensson | 713/168 |
| 2003/0224823 A1* | 12/2003 | Hurst et al. | 455/558 |
| 2004/0137890 A1* | 7/2004 | Kalke | 455/418 |
| 2004/0180673 A1* | 9/2004 | Adams et al. | 455/456.2 |
| 2006/0003758 A1* | 1/2006 | Bishop et al. | 455/419 |
| 2007/0232272 A1* | 10/2007 | Gonsalves et al. | 455/412.1 |
| 2008/0064367 A1* | 3/2008 | Nath et al. | 455/411 |

* cited by examiner

*Primary Examiner* — Wesley Kim
*Assistant Examiner* — Dinh P Nguyen (57) ABSTRACT

Computer-readable media, systems, and methods for automated device activation are described. In embodiments, an activation message is received from a non-provisioned mobile device identifying a user account. In various embodiments, it is determined whether activation is authorized and, if it is determined that activation is authorized, the non-provisioned mobile device is activated. In various other embodiments, it is determined whether activation is authorized by sending a confirmation message to a provisioned mobile device and receiving an authorization message from the provisioned mobile device.

19 Claims, 5 Drawing Sheets

AUTOMATED DEVICE ACTIVATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Mobile devices are typically used by consumers in conjunction with a subscription to a particular telecommunications provider. The subscription allows the mobile device to communicate over one or more telecommunications networks in the control of the associated provider or other providers that have agreed to allow telecommunications traffic of the associated provider. Each subscription is associated with a user account including one or more devices associated with the user account. Due to the dynamic nature of technology generally, and mobile device technology in particular, consumers using mobile devices often seek upgraded and newer technology during their subscription. Upon obtaining a new mobile device, the consumer must activate the device and have the device associated with the consumer's user account. Typically, the activation process involves calling a call center associated with the service provider and communicating with a customer service representative to have the new device activated. The typical process is not only time-consuming and occasionally frustrating to the consumer, but is also costly to the service provider because call centers must be staffed. It would be advantageous to provide automatic device activation that allows a consumer to activate a new device where the consumer already has a user account.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The systems, methods, and computer readable media embodied herein facilitate automated device activation of a non-provisioned mobile device. Accordingly, in one aspect, this is accomplished by receiving an activation message from a non-provisioned mobile device identifying a user account. Thereafter, it is determined whether activation of the non-provisioned mobile device is authorized. If it is determined that the activation is authorized, automated device activation is accomplished by activating the non-provisioned device in association with the user account.

In another aspect, a computerized system accomplishes automated device activation. The computerized system may include a receiving component configured to receive an activation message from a non-provisioned mobile device and a confirming component configured to send a confirmation message to a provisioned mobile device. Additionally, an authorizing component may be configured to receive an authorization message from the provisioned mobile device. Further, the computerized system may include an activating component configured to activate the non-provisioned mobile device if the authorization message is received from the provisioned mobile device.

In yet another aspect, automated device activation may be accomplished by one or more computer readable media (which are non-transitory) having instructions embodied thereon that, when executed, perform a method for automatic device activation. More particularly, this is accomplished by receiving an activation request identifying a non-provisioned mobile device and a user account. Thereafter a confirmation message having an activation link is sent to a provisioned mobile device associated with the user account. Further, a selection of the activation link and an authorization of the activation request is received from the provisioned mobile device and, upon receiving the authorization, the non-provisioned mobile device is activated.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of the individual steps is explicitly described.

Figure 1:
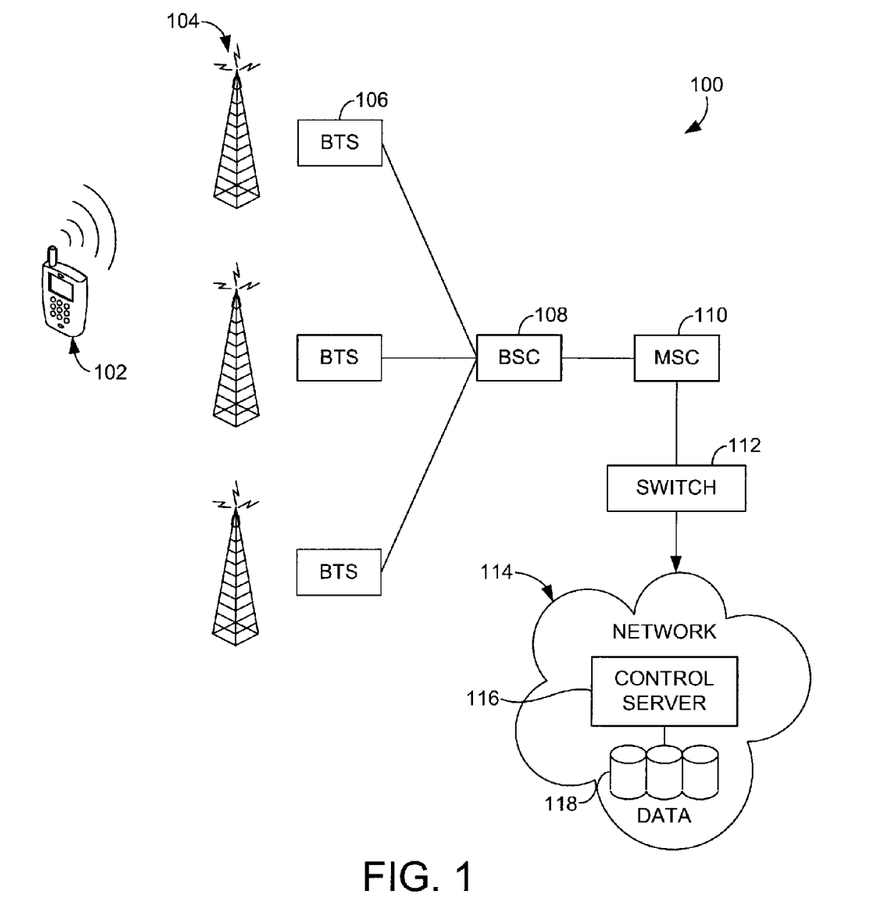
FIG. 1 is a schematic view of an exemplary wireless communications environment suitable for use in implementing the present invention.

With reference to FIG. 1, an exemplary wireless telecommunications network environment is depicted. In the environment 100, a user's cellular or mobile phone 102 communicates over established radio frequencies through a cell tower 104 having a base transceiver system (BTS) 106, a number of which are typically connected to a base station controller (BSC) 108. The BSC 108 manages the communication between a number of BTSs 106 and a limited number of mobile phones 102 compatible with the wireless network 100. The BSC 108 connects to a mobile switching center (MSC) 110 acting as a telephone exchange to handle the mobile phone activity through the associated one or more BSCs 108 while connecting as needed through a telecommunications switch 112 to the public switched telephone network 114 or other data network. The telephone network 114 includes a number of control servers 116 that manage the flow of data signals through the network 114 and connect as needed to a number of databases 118 that include information such as registrations of mobile phones 102 and associated accounts, other airtime credit information such as pin codes and associated account values, and other information.

Figure 2:
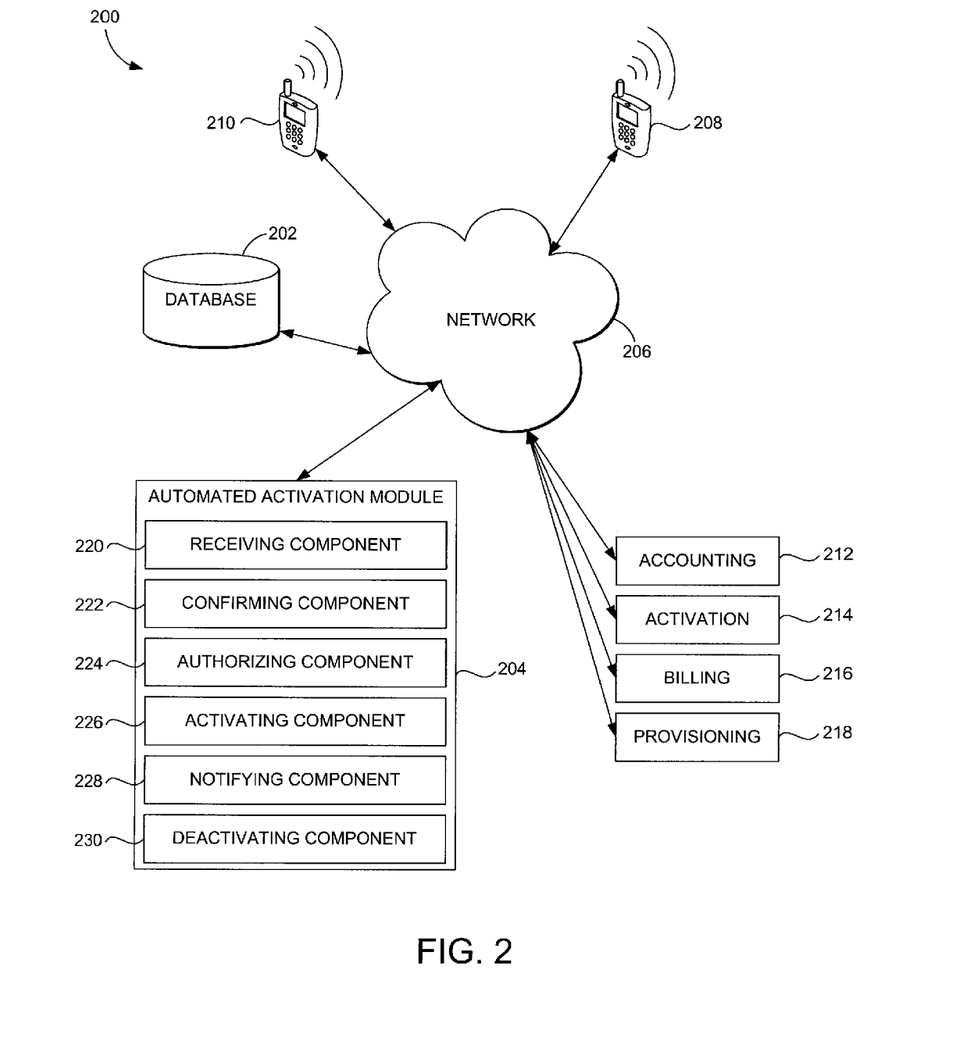
FIG. 2 is a block diagram illustrating an exemplary system for automated device activation, in accordance with an embodiment of the present invention.

Turning now to FIG. 2, a block diagram is provided illustrating an exemplary system 200 for automated device activation, in accordance with an embodiment of the present invention. It will be understood and appreciated by one of ordinary skill in the art that a user associated with the particular provisioned mobile device has a pre-established subscription to a particular telecommunications provider, which is associated with a primary account for the user. The system 200 includes a database 202, an automated activation module 204, a provisioned mobile device 208, and a non-provisioned mobile device 210 in communication with one another via a network 206. In various embodiments, without limitation, system 200 may also include accounting 212, activation 214, billing 216 and provisioning 218 all in communication with network 206. Network 206 may include, without limitation, a telecommunications network such as network 114 of FIG. 1, one or more local area networks (LANs) or wide area networks (WANs) or combinations thereof. Such individual or combinational networking environments are commonplace in telecommunications, enterprise-wide computer networks, intranets, and the Internet. Accordingly, network 206 is not further described herein.

Database 202 is configured to store information associated with the automated device activation environment. In various embodiments, such information may include, without limitation, user account information including a mobile directory number (MDN) and a mobile station identification (MSID), and provisioned device information including electronic serial number (ESN), model number, manufacturer, and other information associated with the user's provisioned device. In various embodiments, without limitation, database 202 may be in communication with accounting 212, activation 214, billing 216 and provisioning 218 in order to configure complete user profile information, associated with a user account, for use in the automated device activation environment. It will be understood and appreciated by those of ordinary skill in the art that information stored in database 202 may be configurable and may include various information relevant to automated device activation. The content and/or volume of such information are not intended to limit the scope of embodiments of the present invention in any way. Further, though illustrated as a single, independent component, database 202 may, in fact, be a plurality of databases, for instance, a database cluster, portions of which may reside on a computing device associated with automated device activation module 204, on another external computing device (not shown) or any combination thereof.

Provisioned mobile device 208 and non-provisioned mobile device 210 may include various types of mobile communication devices such as, without limitation, mobile telephones, mobile pagers, and mobile personal data assistants (PDAs). It will be understood and appreciated by one of ordinary skill in the art that provisioned mobile device 208 has been activated and associated with a user account. By way of example, without limitation, provisioned mobile device 208 may be a user's mobile telephone that is activated and operational with a user account associated with a particular service provider. One of ordinary skill in the art will also understand and appreciate that non-provisioned mobile device 210 is not presently activated and is not operational with the user account associated with the service provider. For instance, without limitation, non-provisioned mobile device 210 may be a new telephone that the user has purchased or a used telephone purchased from another mobile device user or other commercial outlet.

Automated activation module 204 may be a type of computing device and includes receiving component 220, confirming component 222, authorizing component 224, activating component 226, notification component 228, and deactivating component 230. Further, automated activation module 204 is configured to operate utilizing at least a portion of the information stored in database 202. In various embodiments, without limitation, automated activation module 204 may be used to automatically activate a user's non-provisioned mobile device, e.g., such as non-provisioned mobile device 210. For instance, without limitation, automated activation module 204 may allow a user to activate a non-provisioned device without calling customer service and being subjected to customer service delays, as often occurs. Further, automated activation module 204 may include verification to ensure the user's account information is not accessed and transferred to a non-provisioned device without authentication from the user. By way of example, without limitation, in various embodiments of the present invention a user may have an existing provisioned mobile device associated with a service provider. In this example, where the user obtains a new mobile device and desires to activate the new mobile device, automated activation module 204 may enable the user to activate the new device without calling customer service or traveling to a commercial outlet associated with the user's service provider. Instead, automated activation module 204 will enable the user to activate the non-provisioned device automatically. As discussed herein, in various embodiments, the user is enabled to activate the non-provisioned mobile device using only the non-provisioned mobile device and the provisioned mobile device. Embodiments of the present invention, however, are not limited to any particular device usage. For example, it is contemplated and within the scope of the present invention that activation using automated activation module 204 may be initiated by other user devices, such as a personal computer, as described in more detail herein. Automated activation module 204 will verify with the user that the activation of the new device is desired to ensure the user approves of the activation of the non-provisioned device.

Receiving component 220 is configured to receive an activation message from a non-provisioned mobile device. In various embodiments, without limitation, a mobile user sends an activation message from, e.g., non-provisioned mobile device 210. The activation message may include a MDN and an MSID associated with the user's account. In various embodiments, without limitation, the activation message may be a text message sent using short messaging service (SMS) protocol. Further, in various embodiments, without limitation, the SMS message may be sent using a dedicated priority message delivery to an automated device activation address that is embodied on the non-provisioned device. Thus, as will be understood and appreciated by one of ordinary skill in the art, a priority mechanism may be used to allow communication from the non-provisioned device although the device has yet to be associated with a service provider. In various embodiments, without limitation, where a priority mechanism is used, the address to automated device activation module 204 may be pre-set on non-provisioned device 210. Further, in various embodiments, without limitation, the activation message will include an ESN, a manufacturer and model number of the non-provisioned device. One of ordinary skill in the art will understand and appreciate that the dedicated priority message delivery may be limited to only activation messages and may not be configured to allow other forms of communication from the non-provisioned mobile device.

Confirming component 222 is configured to send a confirmation message to a provisioned mobile device, e.g., provisioned mobile device 208. By way of example, without limitation, in various embodiments of the present invention, upon receiving an activation message from a non-provisioned mobile device, automated device activation module 204 may validate the user account and device using the information from the activation message and confirming component 222 may generate and send an SMS message to the user. In various embodiments, without limitation, the SMS message may include an activation link for the user to select, indicating that activation of the non-provisioned mobile device is authorized.

Authorizing component 224 is configured to receive an authorization message from the provisioned mobile device, e.g., provisioned mobile device 208. By way of example, without limitation, in various embodiments of the present invention, upon receiving a confirmation message, the user may select the activation link and, if the user chooses to authorize activation of the non-provisioned device, the user may confirm activation. As will be understood and appreciated by one of ordinary skill in the art, the verification feature implemented by confirming component 222 and authorizing component 224 will ensure that non-authorized activations will be avoided. Thus, in various embodiments, without limitation, using non-provisioned device 210 and provisioned device 208, the user is capable of initiating and authorizing activation of non-provisioned device 210.

Activating component 226 is configured to activate the non-provisioned mobile device if the authorization message is received by authorizing component 224. Thus, where no authorization message is received, automated device activation module 204 will not activate non-provisioned device 210. Where the authorization message is received from provisioned device 208 by authorizing component 224, however, activation of non-provisioned device 210 will proceed. Activation techniques are well-known by those of ordinary skill in the art and, thus, will not be further described herein. Additionally, in various embodiments, upon receiving the authorization message, notifying component, which is configured to send a notification message indicating that the non-provisioned mobile device will be activated and the provisioned mobile device will be deactivated, will generate a message to the user. In various embodiments, without limitation, the notification message may be an SMS message.

Upon activating non-provisioned mobile device 210 with activating component 226, deactivating component 230 will deactivate provisioned mobile device 208. In various embodiments this activating and deactivating may occur simultaneously so that the instant non-provisioned mobile device 210 is activated, provisioned mobile device 208 will be deactivated. Further, in various embodiments, this activation and deactivation may occur immediately upon receiving the authorization message or may occur well after receipt of the authorization message. Thus, in various embodiments of the present invention, the specific recipient of the notification message may be either non-provisioned mobile device 210 or provisioned mobile device 208. Stated differently, where activation occurs immediately, in various embodiments, the notification message may be sent after the activation and deactivation and the notification message will be sent to non-provisioned mobile device 210 that is now activated.

The above discussion is intended to illustrate implementation of various embodiments of the present invention for exemplary purposes. The above discussion, however, is in no way meant to limit system 200 to a particular configuration. For example, in various embodiments some components of automated device activation module 204 may be present or absent. Thus, it will be understood and appreciated by those of ordinary skill in the art that additional components not shown may also be included within any of system 200, database 202, and automated device activation module 204.

Figure 3:
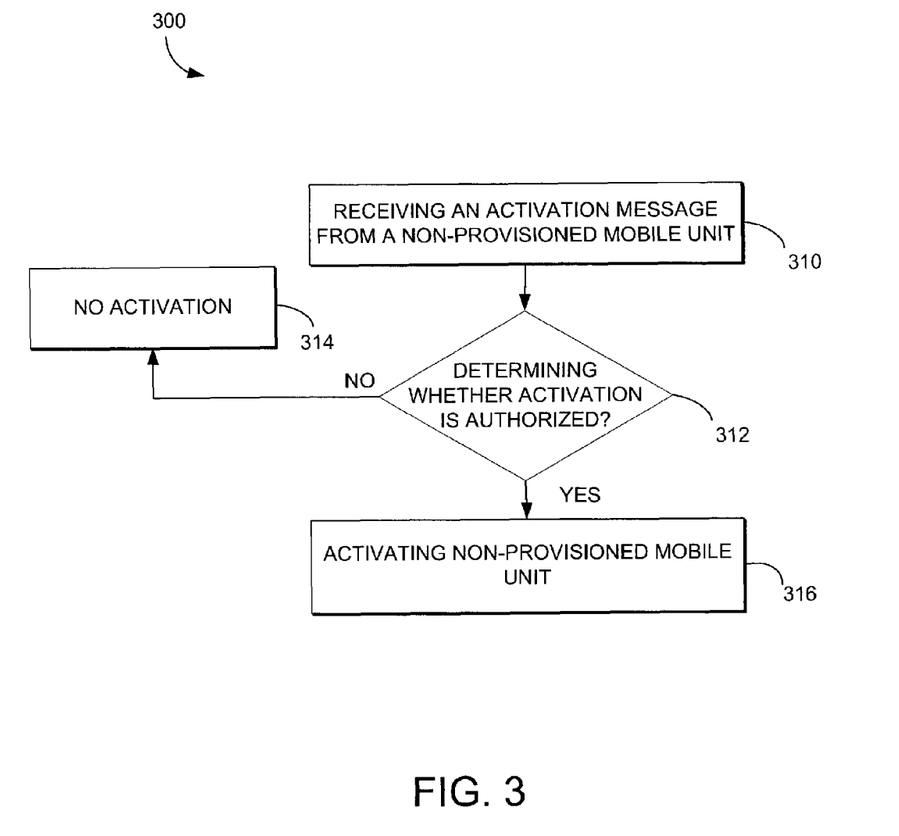
FIG. 3 is a flow diagram illustrating an exemplary method for automated device activation, in accordance with an embodiment of the present invention.

Turning now to FIG. 3, a flow diagram of an exemplary method for automated device activation, in accordance with an embodiment of the present invention, is illustrated and designated generally as reference numeral 300. Initially, as indicated at block 310, an activation message is received from a non-provisioned mobile device (e.g., by receiving component 220 of FIG. 2). By way of example, without limitation, the activation message may be an SMS message received through a dedicated priority message delivery. For instance, a user of the non-provisioned device, who already has a user account with a service provider, may select an option on a non-provisioned mobile device to activate the non-provisioned mobile device. In various embodiments, without limitation, the user may be prompted to identify the MDN and MSID associated with the user's account.

Next, as indicated at block 312, it is determined whether activation is authorized. By way of example, without limitation, the authorization may be determined by prompting the user's provisioned device. One of ordinary skill in the art will understand and appreciate that, where the user has an active account with a service provider, a provisioned device will be in service and the automated device activation environment will have the requisite information available to communicate with the user on the provisioned device. In various embodiments, without limitation, prompting the user for authorization may include sending the user an SMS message on the user's provisioned device. Further, in various embodiments, without limitation, the SMS message may include an activation link for the user to select. One of ordinary skill in the art will understand and appreciate, however, that the present invention is not limited to a particular authorization determination procedure. For example, authorization may be determined by way of calling the user on a mobile telephone. As another example, authorization may be determined by emailing the user at an email address associated with the user's account. Any and all such variations, and any combinations thereof, are contemplated to be within the scope of embodiments of the present invention. If it is determined that activation is not authorized, the method advances to block 314 and does not activate the non-provisioned device and the initiated activation is terminated. If, however, it is determined that activation is authorized, the non-provisioned mobile device is activated (e.g., by activating component 226 of FIG. 2), as indicated at block 316.

Figure 4:
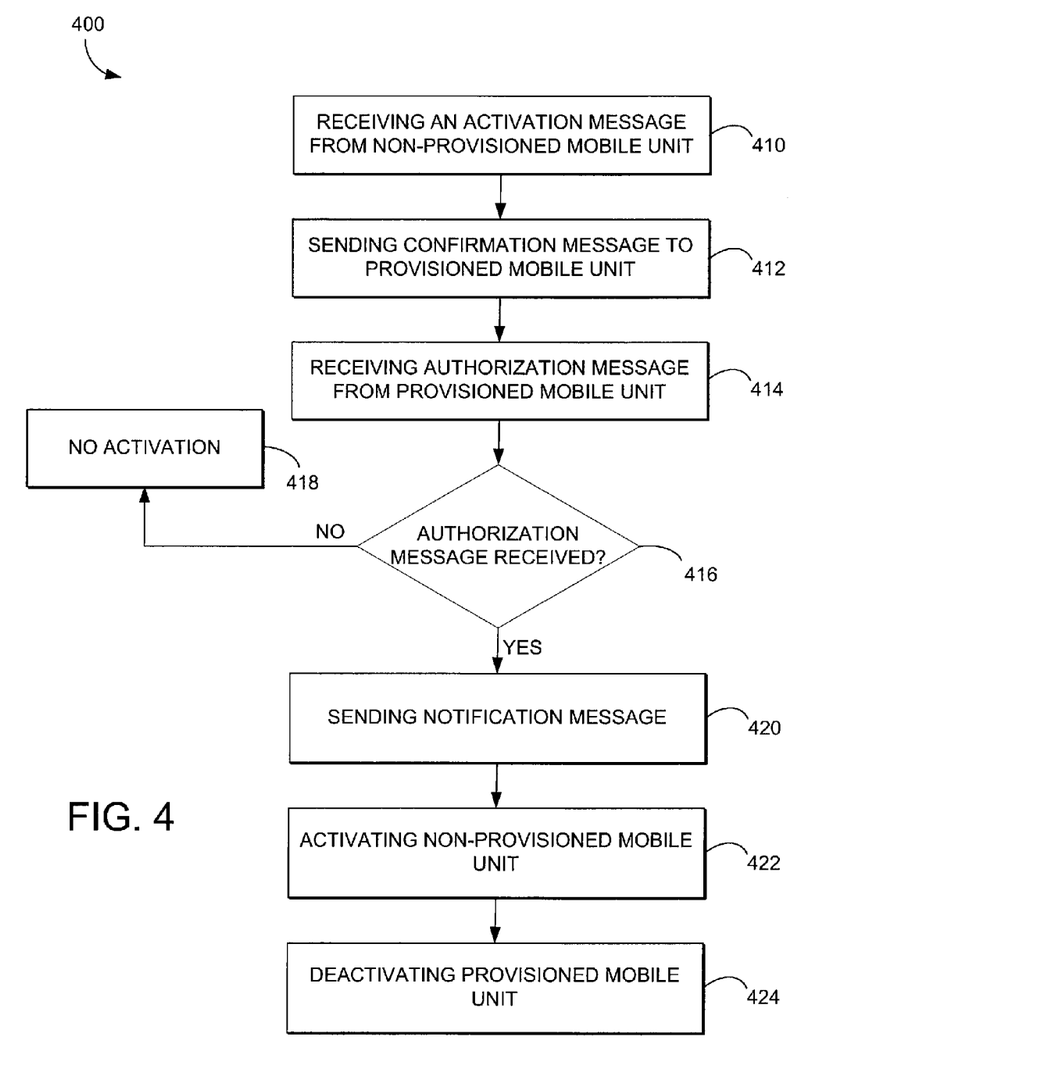
FIG. 4 is a flow diagram illustrating an exemplary method for automated device activation, the method having more detail than the method in FIG. 3, in accordance with an embodiment of the present invention.

Turning now to FIG. 4, a flow diagram of an exemplary method for automated device activation, the method having more detail than the method in FIG. 3, in accordance with an embodiment of the present invention, is illustrated and designated generally as reference numeral 400. Initially, as indicated at block 410, an activation message is received (e.g., by receiving component 220 of FIG. 2), as previously discussed with reference to FIG. 3. Next, as indicated at block 412, a confirmation message is sent to a user's provisioned mobile device (e.g., by confirmation component 222 of FIG. 2). By way of example, without limitation, an SMS message may be sent to a user's provisioned mobile device. In various embodiments, without limitation, the SMS message may include an activation link for the user to select if the user authorizes activation of the non-provisioned device. Further, in various embodiments, the SMS message will include a description of the non-provisioned mobile device that initiated activation, such as the model and manufacturer of the device, so as to identify to the user the device seeking activation so the user is capable of authorizing activation. Embodiments of the present invention, however, are not limited to an SMS confirmation message. For instance, as previously discussed, those of ordinary skill in the art will understand and appreciate that the confirmation message may be in the form of a phone call to a user's mobile telephone or an email message delivered to an email address associated with the user's account, or various other types of confirmation.

Thereafter, as indicated at block 414 an authorization message is received from a user's provisioned mobile device (e.g., by authorization component 224 of FIG. 2). By way of example, without limitation, where the SMS message sent to the user at block 412 included an activation link, the authorization message may include an indication that the user selected the authorization link, along with confirmation of the authorization. Stated differently, where the user authorizes activation of the non-provisioned device, upon selecting the activation link, the user may be prompted to confirm that activation is authorized. In various embodiments, without limitation, upon confirmation from the user, the authorization message will be received from the provisioned mobile device. Embodiments of the present invention, however, are not limited to an SMS implementation. For instance, as previously stated, those of ordinary skill in the art will understand and appreciate that where the confirmation message is a phone call to the user's mobile telephone, a voice authorization may be sufficient. Further, where the confirmation message is an email, a reply email may be sufficient authorization.

Thereafter, as indicated at block 416, it is determined whether an authorization message is received. If it is determined that an authorization message is not received, the method advances to block 418 and does not activate the non-provisioned device. For example, in various embodiments, a the confirmation message sent at block 412 may be associated with a time for response. If an authorization message is not received within the dedicated time, the method may assume no authorization is received and not activate the non-provisioned device at step 418, thereby terminating the initiated activation procedure. If, however, it is determined that an authorization message is received, a notification message will be sent (e.g., by notifying component 228 of FIG. 2), as indicated at block 420. By way of example, without limitation, the notification message may be an SMS message indicating that activation of the non-provisioned device was authorized. In various embodiments, the notification message may also indicate that the provisioned mobile device will be deactivated. The notification message may also, in various embodiments, include a timeframe (e.g., 6 hours) for activating the non-provisioned device and deactivating the provisioned device. As previously stated with reference to FIG. 2, as will be understood and appreciated by one of ordinary skill in the art, depending upon the timing of the activating and deactivating, the notification message may be sent to either the non-provisioned device (once it is activated), or the provisioned device (if the non-provisioned device is not yet activated). Thereafter, at block 422, the non-provisioned mobile device will be activated (e.g., by activating component 226 of FIG. 2) and the provisioned mobile device will be deactivated (e.g., by deactivating component 230 of FIG. 2).

Figure 5:
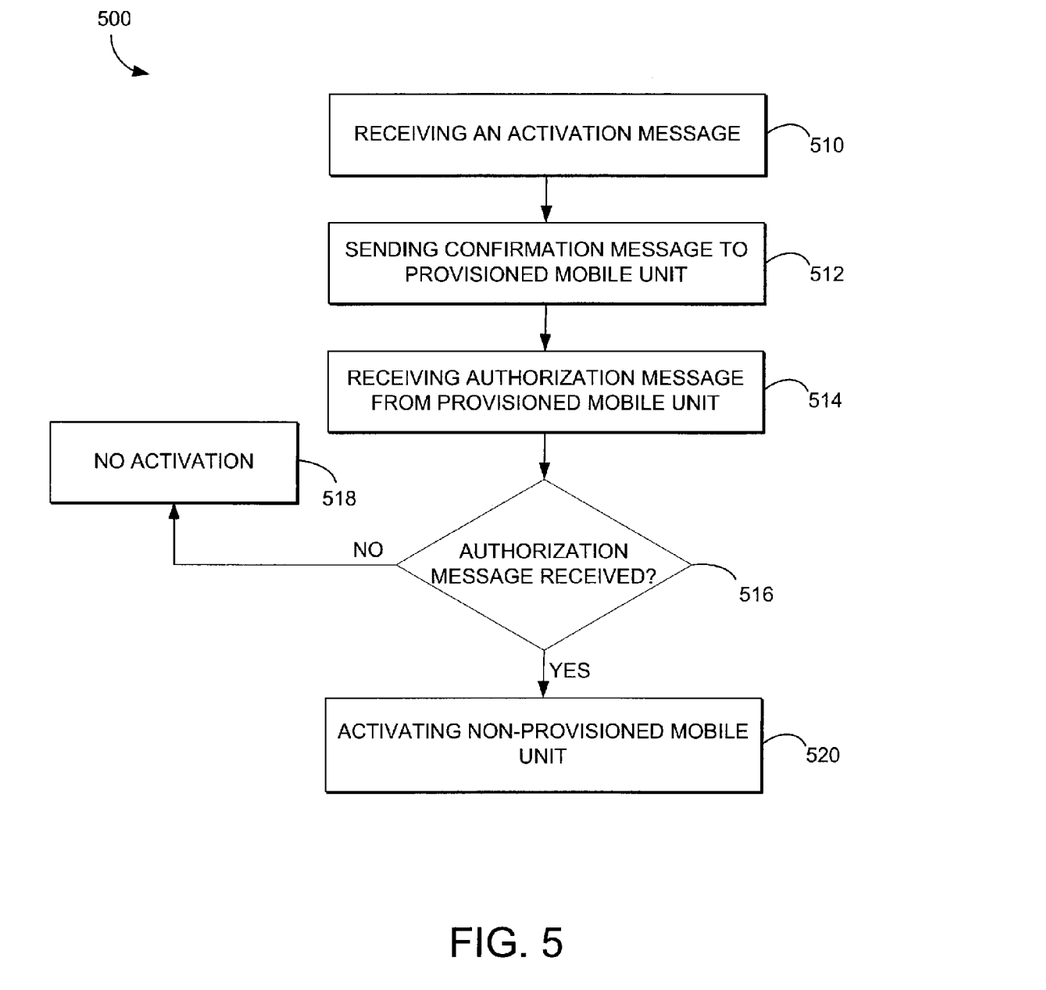
FIG. 5 is a flow diagram illustrating an exemplary method for verifying automated device activation, in accordance with an embodiment of the present invention.

Turning now to FIG. 5, a flow diagram of an exemplary method for verifying automated device activation, in accordance with an embodiment of the present invention, is illustrated and designated generally as reference numeral 500. Initially, as indicated at block 510, an activation message is received. In various embodiments, without limitation, the activation message may be in the form of an SMS message from a non-provisioned mobile device. By way of example, without limitation, the SMS message may include a user-inputted MDN and MSID, as well as an ESN, a model number and a manufacturer for the non-provisioned device. Embodiments of the present invention, however, are not limited to receiving an activation message from a particular device or device. By way of example, one of ordinary skill in the art will understand and appreciate that the method for verifying automated device activation may be used in conjunction with a personal computer. More specifically, in this example, without limitation, where the user has an online account with a service provider, the user may log-in to the online account to initiate automated device activation verification. The verification steps would proceed as discussed herein.

Thereafter, at block 512, a confirmation message is sent to a provisioned mobile device associated with a user's account, as previously discussed with reference to FIG. 4. Further, as previously discussed with reference to FIG. 4, at block 514 an authorization message will be received from the user's provisioned mobile device. If it is determined that an authorization method is not received, the method will proceed to step 518 and the non-provisioned device will not be activated, terminating the initiated activation. If, however, it is determined that authorization is received, the non-provisioned mobile device will be activated. As previously stated, the confirmation message sent at block 512 may be time-sensitive, such that it will be determined at block 516 that no authorization message was received if the authorization message was not received within a particular period of time. As previously stated and as will be understood and appreciated by one of ordinary skill in the art, the method illustrated in FIG. 5 will allow verification of an automated device activation, regardless of the device initiating the activation.

The present invention has been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A method for automated device activation comprising:
   receiving an activation message from a non-provisioned mobile device identifying an existing user account;
   determining whether activation is authorized by:
   (1) sending a confirmation message from a device via a wireless communication network, directly to a provisioned mobile device, wherein the device is different from a non-provisioned mobile device; and (2) receiving an authorization message from the provisioned mobile device; and if it is determined that activation is authorized based on the authorization message, simultaneously:
(1) activating the non-provisioned mobile device;
(2) associating the non-provisioned mobile device with the existing user account; and
(3) deactivating the provisioned mobile device associated with the existing user account.

2. The method of claim 1, wherein determining whether activation is authorized comprises:

sending the confirmation message from a confirming component associated with the wireless communication network; to the provisioned mobile device; wherein the confirming component is different from the non-provisioned mobile device; and receiving at the confirming component the authorization message from the provisioned mobile device.

3. The method of claim 2, further comprising:

sending a notification message indicating that the non-provisioned mobile device will be activated and the provisioned mobile device will be deactivated.

4. The method of claim 3, further comprising:

deactivating the provisioned mobile device.

5. The method of claim 3, wherein the confirmation message and the notification message are sent using a short message service protocol.

6. The method of claim 5, wherein the confirmation message includes an activation link.

7. The method of claim 1, wherein the activation message is received using a short message service protocol.

8. The method of claim 7, wherein the activation message is received using dedicated priority message delivery.

9. The method of claim 8, wherein the activation message includes an account identification including at least one of a mobile directory number and a mobile station identification.

10. A computerized system for automated device activation, the system comprising:

a receiving component configured to receive an activation message from a non-provisioned mobile device;

a confirming component configured to send a confirmation message via a wireless communication network directly to a provisioned mobile device associated with an existing user account to confirm activation of the non-provisioned mobile device that is not yet associated with the existing user account;

an authorizing component configured to receive an authorization message from the provisioned mobile device indicating that the provisioned mobile device confirmed activation of the non-provisioned mobile device;

an activating component configured to activate the non-provisioned mobile device if the authorization message is received from the provisioned mobile device; and at least one database for storing information associated with the non-provisioned mobile device and the provisioned mobile device.

11. The system of claim 10, further comprising:

a notifying component configured to send a notification message indicating that the non-provisioned mobile device will be activated and the provisioned mobile device will be deactivated.

12. The system of claim 11, further comprising:

a deactivating component configured to deactivate the provisioned mobile device such that the provisioned mobile device is no longer operational with the existing user account.

13. The system of claim 10, wherein the receiving component is further configured to receive the activation message using a short message service protocol.

14. The system of claim 13, wherein the receiving component is further configured to receive the activation message using dedicated priority message delivery.

15. The system of claim 10, wherein the confirming component is further configured to send an activation link with the confirmation message.

16. One or more non-transitory computer readable media having instructions embodied thereon that, when executed, perform a method for verifying automatic device activation, the method comprising:

receiving an activation request identifying a non-provisioned mobile device and a user account;

sending a confirmation message having an activation link message from a device via a wireless communication network directly to a provisioned mobile device associated with the user account, wherein the device is different from the non-provisioned mobile device;

receiving a selection of the activation link that confirms activation of the non-provisioned mobile device and an authorization of the activation request from the provisioned mobile device; and upon receiving the authorization from the provisioned mobile device, simultaneously activating the non-provisioned mobile device and deactivating the provisioned mobile device such that the provisioned mobile device is no longer operational with the user account.

17. The computer readable media of claim 16, further comprising:

sending a notification message indicating that the non-provisioned mobile device will be activated and the provisioned mobile device will be deactivated.

18. The computer readable media of claim 17, wherein the confirmation message and the notification message are sent using a short message service protocol.

19. The computer readable media of claim 18 wherein at least one of the non-provisioned mobile device and the provisioned mobile device is a mobile telephone.

* * * * *